(12) United States Patent
Knoop

(10) Patent No.: US 9,251,682 B2
(45) Date of Patent: Feb. 2, 2016

(54) SYSTEM AND METHOD FOR FIRE PREVENTING IN ELECTRICAL INSTALLATIONS

(75) Inventor: Kjell Knoop, Verviers (BE)

(73) Assignee: Gantel Properties Ltd, Gibralter ( * ) Notice: Subject to any disclaimer, the term of this patent is extended or adjusted under 35 U.S.C. 154(b) by 126 days.

(21) Appl. No.: 13/825,984

(22) PCT Filed: Sep. 28, 2011

(86) PCT No.: PCT/NO2011/000274
§ 371 (c)(1),
(2), (4) Date: Sep. 11, 2013

(87) PCT Pub. No.: WO2012/044175
PCT Pub. Date: Apr. 5, 2012

(65) Prior Publication Data
US 2013/0342352 A1     Dec. 26, 2013

(30) Foreign Application Priority Data

Sep. 30, 2010  (NO) .................................... 20101360

(51) Int. Cl.
*G08B 17/00*     (2006.01)
*G08B 17/06*     (2006.01)
*G01K 1/02*     (2006.01)
*G01K 3/00*     (2006.01)

(52) U.S. Cl.
CPC ................ *G08B 17/06* (2013.01); *G01K 1/026* (2013.01); *G01K 3/005* (2013.01)

(58) Field of Classification Search
CPC ......... G01K 1/026; G01K 3/005; G08B 17/06
USPC ........ 340/584, 691.1, 573.1, 572.1, 635, 506, 340/5.1
See application file for complete search history.

(56) References Cited

U.S. PATENT DOCUMENTS

| | | | |
|---|---|---|---|
| 5,722,632 A * | 3/1998 | Rader et al. ............... | 251/129.15 |
| 5,865,198 A * | 2/1999 | Hartman ...................... | 134/56 R |
| 6,965,309 B1 | 11/2005 | Bleznyk et al. | |
| 2005/0174236 A1 | 8/2005 | Brookner | |
| 2006/0019540 A1 | 1/2006 | Wertthman et al. | |
| 2007/0001850 A1* | 1/2007 | Malone et al. ............. | 340/572.1 |
| 2007/0036081 A1* | 2/2007 | Vallet et al. .................... | 370/242 |
| 2007/0103318 A1* | 5/2007 | Boyden ......................... | 340/584 |
| 2007/0273507 A1 | 11/2007 | Burchell et al. | |
| 2010/0045464 A1* | 2/2010 | Knopf et al. ............... | 340/573.1 |
| 2010/0231407 A1* | 9/2010 | Carr .......................... | 340/691.1 |

FOREIGN PATENT DOCUMENTS

WO      WO9956261 A      11/1999

* cited by examiner

*Primary Examiner* — Daniel Previl
(74) *Attorney, Agent, or Firm* — Christian D. Abel

(57) ABSTRACT

A system for fire prevention in electrical installations having one or more temperature sensors arranged in or close to positions in the electrical installation that are to be monitored. One or more electromagnetic signal transmitters are connected to the temperature sensors, one or more electromagnetic signal readers are adapted to communicate with and receive signals from the signal transmitters, and a processing unit is connected to the signal reader for processing the signals and providing an indication signal.

13 Claims, 4 Drawing Sheets

SYSTEM AND METHOD FOR FIRE PREVENTING IN ELECTRICAL INSTALLATIONS

The invention relates to a system and method for fire prevention in electrical installations. Specifically, the invention relates to the monitoring of temperature in electrical panels/cabinets, fuse boxes or the like.

Statistics from the Norwegian Directorate for Civil Protection and Emergency Planning (DSB) and from insurance companies show that fires which have started in electrical installations are a common cause of building fires in Norway. The cause is often overheating in components as a result of a fault in the component, incorrect use of the component, improper installation or faults due to age and wear.

Business interruption can have major consequences for firms. Production loss and loss of equipment and valuable data may have substantial financial consequences.

Today's regulations (NEK 400) set requirements for periodic inspection of all electrical installations in order to determine whether the installation is in a satisfactory condition for continued operations. The frequency of the periodic inspection should be based on a risk assessment of the installation. In industrial installations, it is common to have inspections once a year. The electrical panel is included in the inspection of the electrical installation.

Today, inspection of electrical installations is often carried out with the aid of thermophotography. An IR camera detects abnormal heat generation as a result of, inter alia, loose connections and defective components. Such abnormal heat generation indicates a fault, and the fault can be rectified before the generation of heat causes a fire.

US2007/0103318 describes an alarm system for detecting excess temperature in electrical wiring. The system comprises a temperature sensor which detects temperature and a processor which compares the measured temperature with a threshold value. If the threshold value is exceeded, an alarm signal is sent.

US 2007/0273507 describes the use of RFID technology combined with temperature measurements.

In many countries it is the firms/property owners who are themselves responsible for their electrical installations. This means that the authorities and insurance companies set requirements as to documentation of maintenance through their internal checks.

More improvements are desirable. By monitoring electrical installations using technology based on passive RFID sensors and allowing these sensors to communicate with a PC at an operations centre, as in the system according to the invention, a number of advantages are obtained. For example:
Almost continuous monitoring of the electrical installation makes it possible to give warning of increased temperature of components and cables/cable terminals at an early stage so that faults can be rectified in time.
The costs over time will be lower than when using thermophotography.
Increased safety for users.

The object of the invention is to provide a system and method for hindering overheating and preventing fire in electrical installations, which remedy the aforementioned drawbacks and have the said advantages.

The object of the invention is obtained by means of a system for fire prevention in electrical installations which comprises
one or more temperature sensors arranged in or close to positions in the electrical installation that are to be monitored;
one or more electromagnetic signal transmitters connected to the temperature sensors;
one or more electromagnetic signal readers adapted to communicate with and receive signals from the signal transmitters; and
a processing unit connected to the signal reader for processing the signals and providing an indication signal.

The object of the invention is also obtained with the aid of a method for fire prevention in electrical installations which comprises
placing one or more temperature sensors in or close to positions that are to be monitored in the electrical installation;
measuring temperature and transmitting an electromagnetic signal by means of one or more signal transmitters connected to the temperature sensors;
receiving the electromagnetic signal by means of one or more signal readers adapted for communicating with and receiving signals from the signal transmitters; and
processing the signals in order to provide an indication signal.

Electrical installations in this context comprise electrical panels, transformers, relays, converters, rotating machines and other electrical equipment, low and high voltage AC and DC installations. The system and the method according to the invention are able to identify faults in cables, bars, compression-type bushings, terminal plugs and components in such electrical installations and thus prevent fire from breaking out.

The positions in which the temperature sensors are arranged and the number of temperature sensors depend on the installation to be monitored. In the case of a cable, an increased load on the circuit containing the cable will result in an increase in temperature along the whole length of the cable, whereas an increased transition resistance at a fault location will result in greatest temperature increase at the fault location and a diminishing increase in temperature with growing distance from the fault location. In large electrical installations, bus bars will often be used in substitution for cables internally in the electrical panel between breakers/fuses. The same principles will apply to bus bars as to cables.

For example, by attaching several sensors along a cable, it is possible to detect any temperature changes along the cable. The more temperature sensors there are, the more accurate the monitoring will be, but since usually it is at the end termination or in cable connection points that faults occur, it may often be sufficient to have three sensors for detecting faults, for example, one sensor attached to the cable end or cable terminal, one sensor attached 5-10 cm from the cable end and a third sensor attached 20-30 cm from the cable end.

As regards components such as breakers/switches, fuses, overload protection devices and contacts, they will normally not have a temperature significantly different from the surroundings. To discover faults in these components, a sensor may be provided for each component. Several alternative methods may then be used to assess whether the temperature is a sign/indication of a fault and hence a risk of fire:
1) The temperature of each component may be compared with other components in the same installation since they will normally have essentially the same temperature.
2) One or more reference sensors may be arranged elsewhere in or close to the installation and the temperature of the components compared to this/these sensors.
3) The temperature of each of the components may be monitored over time and an increase in temperature over a given threshold is an indication of a fault/fire risk.

4) The temperature variation in each of the components may be compared with variation in the power consumption of the installation, as increased power consumption gives increased temperature in components.

Each of the temperature sensors is connected to a transmitter for transmitting electromagnetic signals. Each transmitter may have assigned thereto a single sensor, or several sensors may be connected to one and the same transmitter. Such a transmitter may, for example, be an RFID chip (radio frequency identification chip). An RFID chip contains antennas which enable it to receive and respond to radio frequency signals from an RFID transceiver. The chip responds at least with its unique identifier, an ID number. There are several types of RFID chips. Passive chips respond with a weak radio signal and need no power source, whilst active chips send a stronger response signal over a slightly greater distance and need a power source. A third alternative is the semi-passive chip which must have an external source in order to initiate transmission/response, but which has higher transmission strength and thus a greater range.

Examples of alternative signal transmitters are optical transmitters and SAW-based transmitters, for example, SAW-based RFID chips.

In an embodiment, the temperature sensors are integrated in the same unit as the electromagnetic signal transmitter. For example, several combinations of RFID chips and temperature sensors or other types of sensor have been described. U.S. Pat. No. 7,446,660, U.S. Pat. No. 6,712,276 and CA 2383049 are examples of this. Intel Research has developed a technology called WISP (Wireless Identification and Sensing Platform) which has the properties of an RFID chip and also supports sensor reading and computations. WISP can be read by a RFID reader/transceiver and can perform tasks such as reading sensor data and reporting sensor data back to the RFID reader. Other types of transmitter can also be integrated with the temperature sensors.

In an embodiment, the temperature sensors and/or electromagnetic signal transmitters comprise a memory/memory unit for storing data. For example, the temperature measurements can be stored as temperature data, either for later use or for transmitting several measurements a time with intervals in between. The sensors and/or the transmitters may also comprise a processing unit, and in that case more measurement data can be stored for use in the processing.

The electromagnetic signal readers are units capable of receiving data from the electromagnetic signal transmitters. The signal readers can, in one embodiment, also transmit signals. In the case of SAW chips, for example, RFID, the transceivers will transmit radio frequency signals to the chip, which in turn will respond with a temperature signal and its identification. In the case of an RFID chip, the transceiver could be a standard RFID reader.

The processing unit in the system processes the signals received by the transceiver. The processing unit may, for example, be a PC. As an example, received temperatures are compared with threshold values to give an indication of abnormally high temperature/fire risk as a basis for an indication signal. Each of the temperature sensors or signal transmitters, or both, may have assigned thereto unique ID numbers. The threshold values may be individual for the different temperature sensors or may be general for a plurality of sensors. The threshold values may be pre-programmed for each individual temperature sensor and associated with the unique ID numbers. Several threshold values may also be set for each temperature sensor so as to be able to determine the degree of fire risk. As an example, a first threshold value can be set just above the natural temperature variation for the position in question, whilst a second threshold value is set just below a known limit value for maximum allowed temperature for the component located at the position in question. When the first threshold value is exceeded, the processing unit can prioritise the monitoring of this sensor/position. The processing unit may also contain information about the positions of the temperature sensors in the electrical installation. The system may comprise means for programming the processing unit and means for submitting data to the processing unit.

In an embodiment, the electrical installation also comprises a meter that reads power consumption. This is relatively common in larger electrical installations. When more current passes through a component, the temperature will naturally rise. Therefore, a further possibility will be for the processing unit to compare the power consumption with the temperature measurements in order to assess the risk of fire. If the temperature rises more than the power consumption, this will be an indication of overheating/fire risk. This information can be used alone or in addition to other information for providing an indication signal.

The processing unit can also be adapted to detect faults and emit an indication of fault/fault signal. Faults may, for example, be that a signal transmitter does not transmit data or transmits incorrect data, that the measurements are outside the measuring range, etc.

An indication signal gives information to a user regarding overheating in the system and a danger of fire. The indication signal may be visual, audible or tactile. The indication signal may be a percentage which indicates the probability of fire, a figure or a scale which shows the temperature directly, an alarm signal which indicates that a threshold has been exceeded, or other suitable indication. The indication signal can be read or in some other manner used directly by a user, or it can be used as a basis for activating an alarm or for displaying fire risk, or as a basis for triggering an action which prevents or hinders fire from breaking out.

In an embodiment, the system comprises a display unit for displaying the indication signal or information derived therefrom. The system may also comprise an alarm that is triggered when the temperature measurement exceeds a pre-determined threshold value. The alarm may comprise several alarm levels. The different alarm levels may, for example, be associated with different threshold values.

In an embodiment, an action that prevents fire from breaking out may be to break the current/lower load automatically or manually. For example, the processing unit can be connected to the electrical installation or transmit a signal to the electrical installation to break the current when a threshold value for temperature is exceeded. Another action may be to alert an operator by means of a text message, e-mail or telephone call. The processing unit may be a part of or connected to an operations centre for a plurality of electrical installations.

The invention will now be described in more detail with the aid of an example and with reference to the attached figures.

Figure 1:
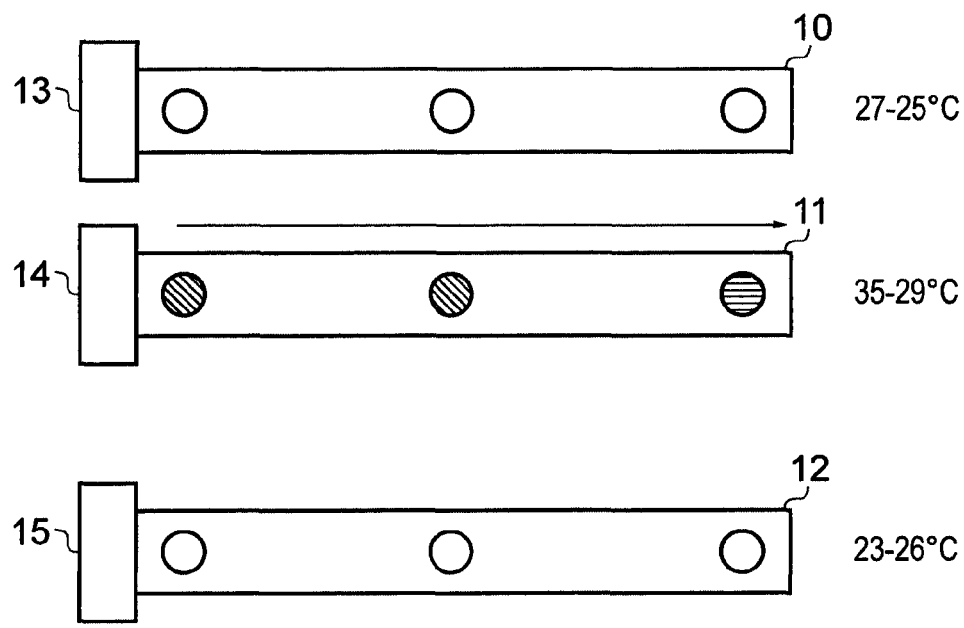
FIG. 1 shows an example of a thermography image according to the prior art.

FIG. 1 is a schematic representation of the principles of a thermography image with examples of temperature differences in three conductors 10, 11, 12 terminated in switches 13, 14, 15. To the right of the conductors are indicated examples of different temperatures for these conductors, and the circles on the conductors illustrate how temperature sensors can be used to obtain the same information as a thermography image. The upper 10 and the lower 12 conductor maintain a relatively constant temperature of between 25 and 27° C. and 23 and 25° C., respectively. The middle conductor 11, however, has an elevated temperature of about 35° C. at the end closest to the switch 14, with the temperature falling gradually to 29° C. at the other end. This indicates that there is a fault at the junction between conductor 11 and switch 14, which results in heat generation and a need for attention if outbreak of fire is to be prevented. A thermography image of these conductors at this point in time would detect this heat generation, and the cause could be removed and a fire avoided. However, such thermophotography often takes place at long intervals and in some cases increased temperature will not be spotted in time. To be sure of spotting an increase in temperature in time, the monitoring must take place at shorter intervals. In order to be able to monitor these conductors continually, there could, according to the invention, be provided, for example, three temperature sensors on each conductor, where each temperature sensor is connected to a signal transmitter which transmits temperature data to a central unit that uses the temperature data to prevent outbreak of fire. In the figure this is illustrated by three circles on each conductor which represent a temperature sensor. The temperature at the sensors on the upper and the lower conductor is in a range which does not give cause for concern, whilst the middle conductor has an increased temperature. This is illustrated in the figure in that the temperature sensors in the upper and lower conductors are at a level that is not alarming, whilst the temperature sensors in the middle conductor are at two different alarm levels. By defining two (or more) alarm levels or threshold values for temperature, it will be possible to become aware of an increase in temperature at an early stage, and the different alarm levels or temperature measurements can be used to locate the source of the fault causing the temperature rise.

Figure 2:
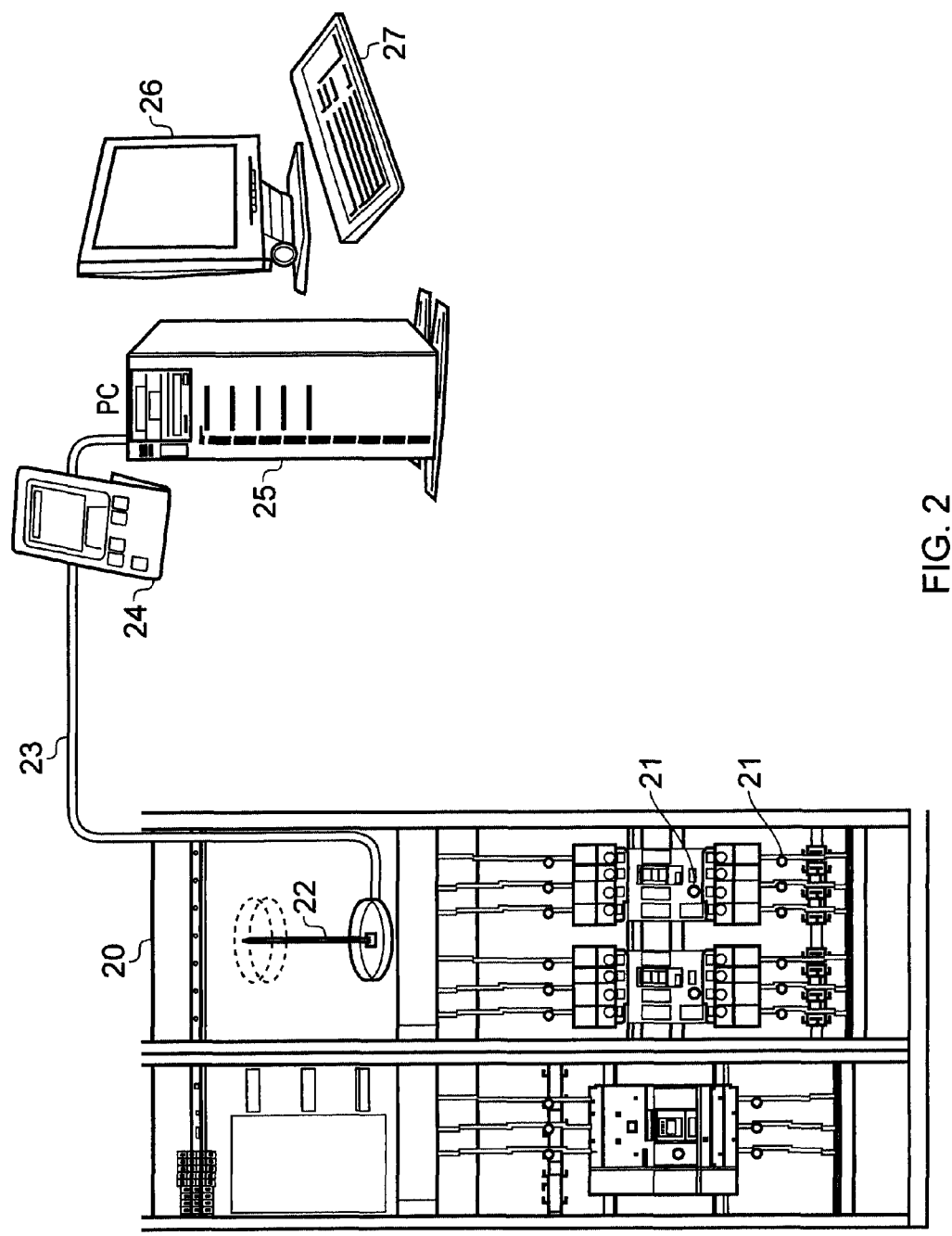
FIG. 2 shows an embodiment of a system according to the invention.
Figure 3:
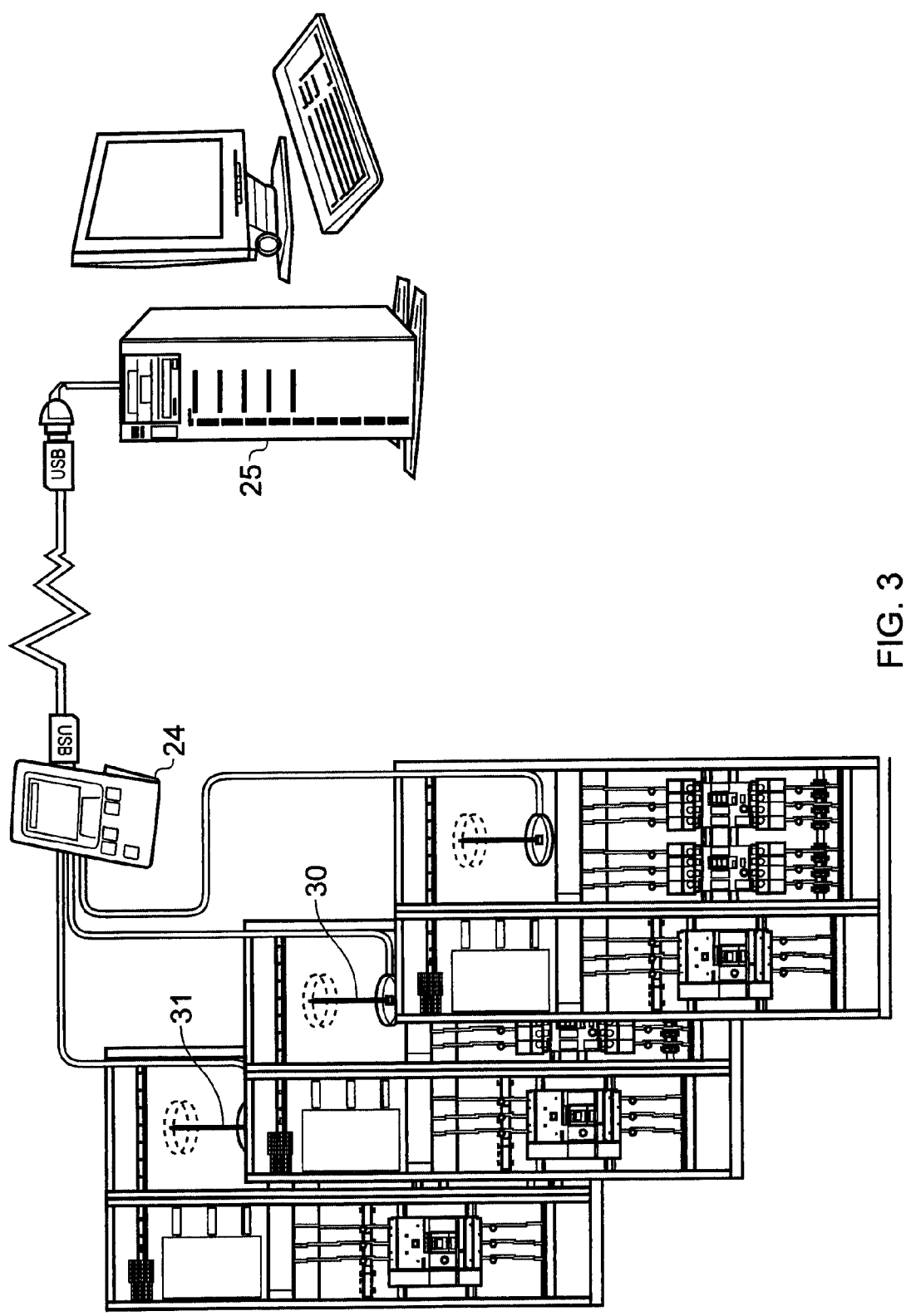
FIG. 3 shows an alternative embodiment of a system according to the invention
Figure 4:
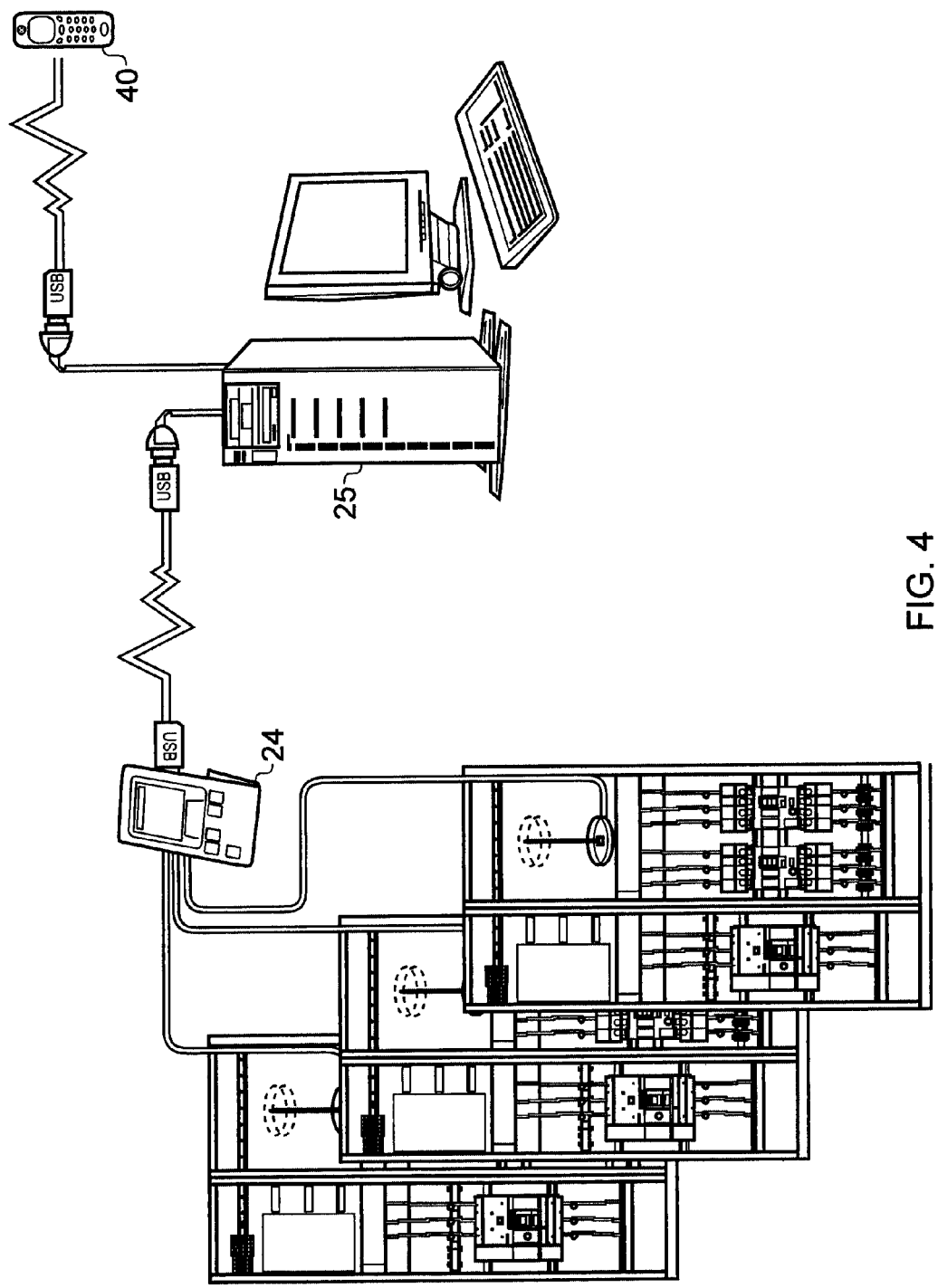
FIG. 4 shows another alternative embodiment of a system according to the invention.

FIGS. 2-4 show different examples of an embodiment of a system according to the invention. An electrical cabinet 20 is, in this example, the electrical installation that is to be monitored. The electrical cabinet comprises several components, cables and bars. The electrical cabinet may also comprise a meter for power consumption. Faults in components, cables and connections between them could lead to heat generation that may result in fire.

In the embodiment in FIG. 1, the system for fire prevention in electrical installations comprises several temperature sensors 21 arranged in or close to positions in the electrical installation that are to be monitored. The temperature sensors 21 here are placed on active components such as fuse boxes and on cables. Each component and cable has a temperature sensor arranged thereon, but in other embodiments several sensors can be arranged on each component/cable/other points in the installation. For example, temperature sensors may be arranged in the upper and lower part of the cabinet.

When installing the system in the electrical installation, the installation engineer will record the positions at which the temperature sensors are placed, for example, by marking these positions on an image of the installation. This record may be electronic, for example, stored in a computer, or non-electronic. Each temperature sensor is connected to at least one electromagnetic signal transmitter. In the embodiment in FIGS. 2-4, we will use RFID chips as an example of such a signal transmitter. An RFID chip has its unique ID number. This ID-number is also recorded so that the system knows which ID number is associated with the different temperature sensors and which positions they represent. Other information may also be recorded in connection with the temperature sensors, such as the date of installation, name of the electrical installation technician, etc. Each of the RFID chips communicates with at least one electromagnetic receiver and transmitter, here in the form of an antenna 22 connected to a reader unit 24. The antenna 22 is able to receive the signals from the RFID chips and relay them via a cable 23 to the reader unit 24. The reader unit receives the signals and is able to interpret them into, for example, the ID number of the RFID chip and the temperature read. The reader unit transmits this data on to a processing unit, in this case a computer 25 (PC), for processing the data and providing an indication signal. In other embodiments, the reader unit may be a part of the processing unit, so that interpretation and other processing of the signals take place in the same unit, for example, a computer. The reader unit may, in one embodiment, also be capable of transmitting signals to the signal transmitters to request a measurement.

A program in the computer compares, for example, the received temperature values with pre-determined threshold values. The threshold values are set on the basis of the elements in the electrical installation that the different temperature sensors measure. For example, if the maximum allowable temperature limit value for a conductor is known to be 70 degrees, the threshold value is set at 45 degrees. Several threshold values may also be set for each sensor at different levels, where exceeding the different threshold values initiates different actions/operations in the program. The program is also able to compare the temperature values with measurements of power consumption, for example, by comparing variations in temperature over a period with variation in power consumption in the same period. Increased temperature without an increase in power consumption can initiate actions in the program as mentioned above.

The computer/program also comprises information about the different aspects of the electrical installation and the sensors, such as the information recorded in connection with the installation of the system as described above. This information may be contained in a database.

This information and other information can be shown on a screen 26 connected to the computer 25. The computer 25 may also be connected to a keyboard 27 which allows an operator to alter the information or software in the computer.

Information that is shown on the screen may, for example, be images of relevant components, images of the installation with highlighted components, temperature, RFID chip ID number, alarm indication, tables, graphs or diagrams of temperature records, etc.

FIG. 3 shows a variant of the system shown in FIG. 2, and illustrates the case in which the computer 25 is located remote from the reader unit 24. In this case, the reader unit 24 comprises communication means to be able to transmit data to the computer over large distances, for example, wirelessly. This solution allows the processing of the temperature data to be done in an operations centre located elsewhere that at the electrical installation. A centre of this kind can, for example, monitor several electrical installations spread geographically over a largish area. In FIG. 3 a plurality of antennas 22, 30, 31 are also provided in the electrical installation, and all the antennas are connected to the reader unit 24 via a cable. Each antenna is able to read one or more RFID chips.

FIG. 4 shows a variant of the system in FIG. 3 where the computer 25 transmits information to a mobile telephone 40. The transmission may be in the form of a text or a picture message or a telephone call. The computer may, for example, be programmed to carry out such communication by telephone at temperatures above a maximum threshold, i.e., an alarm level. A possibility of this kind renders it unnecessary to have continuous manning of an operations centre but nonetheless enables an operator to turn out and prevent outbreak of fire.

EXAMPLE

In what follows, an example will be described of the programming of a computer (PC) for use in the system according to the invention. This is only intended as a single example and there could be a number of other embodiments.

The program may have several modes: Entry of data (manual), test running, monitoring (normal operating situation), fault condition and alarm condition.

The program may be equipped with a time lock, such that it stops if the license agreement is not renewed (one year at a time).

Entry of Data

In this mode, the screen image is "split" in two. On the left is shown the image/images of the installation that is/are to be marked with RFID sensors. On the right, a library is shown.

The library contains RFID sensors and drop-down menus for comment boxes that are to be linked to each individual RFID sensor.

The electrical installation technician enters images showing locations in which the RFID sensors are to be placed. The installation engineer marks off on the images all the locations in which he places RFID sensors. This is done directly on the image by means of a drag-and-release method. When the RFID sensor has been placed in the screen image and recorded in the program, this is shown by a green circle being superimposed on the image at the location in which the sensor is placed. The location on the image should then illustrate where the sensor is located in the actual electrical installation.

The program is able to read and process all values that come from the RFID reader unit.

Monitoring (Normal Operating Situation)

Reference will be made primarily to three different screen images:
1. Images of the installation in question with entered data.
2. All data received in table form.
3. All data received shown graphically in different diagrams which the operator may choose from a menu.

In this mode the screen image is "split" into three. Shown on the left is the image/images of the installation which is/are marked with RFID sensors. On the right of the screen image is shown a table of all data received for the electrical installation in question and a graphical presentation of the data. The three parts can also be shown on two screens, such that the image of the installation is shown in the left-hand screen image, whilst the table and the graphical representation are shown in the right-hand screen image.

When the mouse pointer is moved over the RFID-sensor, the entered data becomes visible.

For each installation that is marked with RFID-sensors, the following will be recorded and shown on the screen image as a part of the table:

The customer's name, address, telephone number and e-mail address.
The address of the installation, name of a contact person, telephone number and e-mail address of the contact person.
Customer no.
Installation data: Distribution system, System voltage, earthing, short circuit currents, intake arrangements, circuit list and earth fault breakers.

Table Data That is Recorded Continuously
The following data should be shown in the table:
1. Time
2. ID number and location of the RFID sensor
3. Temperature that is measured
4. Power consumption
5. Alarms and the sensor that has caused the alarm
6. Historical data stored from when the measurements started
7. Sensor temperature minus reference temperature is shown in a separate column
8. Fault messages
9. Circuit lists The table can be sorted.

A comment box (here, the person who is going to write the comment must be logged in, such that later it is possible to see who has written in the comment box).

Alarm Level and Alarm Condition

It should be possible to split the alarm level into two: A lower level, which involves the installation being put on a separate monitoring list and being subjected to closer examination, and an alarm level.

RFID sensors which qualify to be on the monitoring list are shown in yellow.

When an alarm goes, this installation is automatically brought up from the database. The RFID sensor which has caused the alarm becomes red in colour and will vary in intensity. At the same time an acoustic signal will be heard. The acoustic signal can be reset.

The operator himself can set the temperature level that is to give an alarm. This is done by selecting a numerical value from a drop-down menu. It is also possible to enter different numerical values, such that the sensors have a different alarm level.

Fault Message

If an RFID sensor does not transmit data, or the data received is unreadable or is clearly outside the probable measuring range, it will be reported through a fault message to the operator. The installation and the RFID sensor are identified. The RFID sensor which shows a fault then changes colour to blue.

Relaying of Alarms

The operator can decide whether alarms are to be relayed by text message or other communication systems.

Screen Image

When installations containing several different images of the electrical installation are shown on the screen, it will be possible to browse in the images in question to find the RFID sensor sought. By touching the ID number in the table, the correct image will be brought up on the screen.

Graphical Display

The operator will be able to mark off in the table for the measurements he would like to have shown graphically.

The graphs shown should be of different colour so that it is easy to distinguish between them.

Print-Outs

All contents will be printable.

Documentation to be Sent to the Customer

All customers will receive a report each month. This is done in that a table and graph with any comments and alarms for the last month are generated automatically. This documentation is then sent to the e-mail address the customer has given. This takes place automatically. The operator can adjust the frequency at which reports are sent to the individual customer.

Reading Time

The operator can decide the frequency and when during the day the reading of data should be done.

The invention claimed is:

1. A system for fire prevention in electrical installations, comprising:
   one or more temperature sensors arranged in or close to positions in the electrical installation to be monitored;
   one or more electromagnetic signal transmitters connected to the temperature sensors and adapted to be able to transmit several temperature measurements at intervals;
   one or more electromagnetic signal readers adapted to communicate with and receive signals from the signal transmitters; and
   a processing unit connected to the signal reader to process the signals and provide an indication signal, said signal indicative of the potential for fire in the electrical installation.

2. A system according to claim 1, wherein the electromagnetic signal transmitters are passive RFID chips.

3. A system according to claim 1, wherein the electromagnetic signal transmitters are active RFID chips.

4. A system according to claim 1, wherein the electromagnetic signal transmitters are semi-passive RFID chips.

5. A system according to claim 1, wherein each of the electromagnetic signal transmitters and temperature sensors are integrated in the same unit.

6. A system according to claim 1, wherein the electromagnetic signal transmitters comprise a memory and are able to store data.

7. A system according to claim 1, further comprising a display unit for displaying the indication signal or information derived therefrom.

8. A system according to claim 1, further comprising an alarm that is triggered when the temperature measurement exceeds a pre-determined threshold value.

9. A method for fire prevention in electrical installations, comprising the steps of:
   placing one or more temperature sensors in or close to positions to be monitored in the electrical installation;
   measuring temperature and transmitting electromagnetic signals at intervals with the aid of one or more signal transmitters connected to the temperature sensors;
   receiving the electromagnetic signal with the aid of one or more signal readers adapted to communicate with and receive signals from the signal transmitters; and
   processing the signals to provide an indication signal, said signal indicative of the potential for fire in the electrical installation.

10. A method according to claim 9, further comprising the step of:
    storing data in the signal transmitters.

11. A method according to claim 9, further comprising displaying the indication signal or information derived therefrom.

12. A method according to claim 9, wherein an alarm is triggered when the temperature measurement exceeds a pre-determined threshold value.

13. A method according to claim 9, further comprising two alarm levels.

* * * * *